June 7, 1938.  T. L. EDWARDS  2,119,631
MILK COOLER AND STORAGE CABINET
Original Filed Jan. 5, 1935
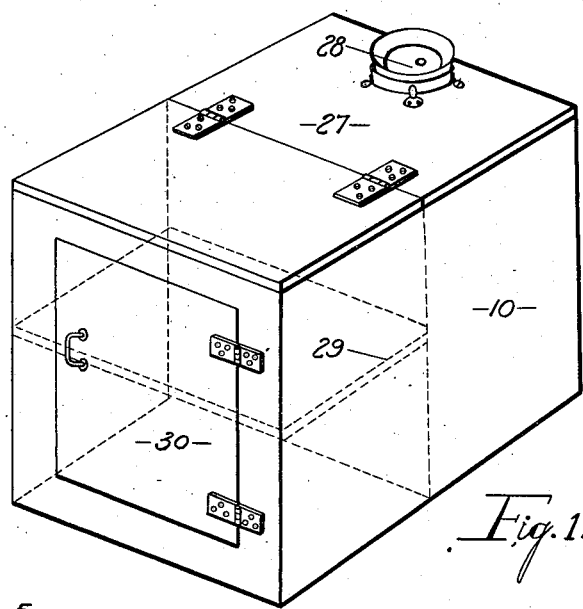
Fig. 1.
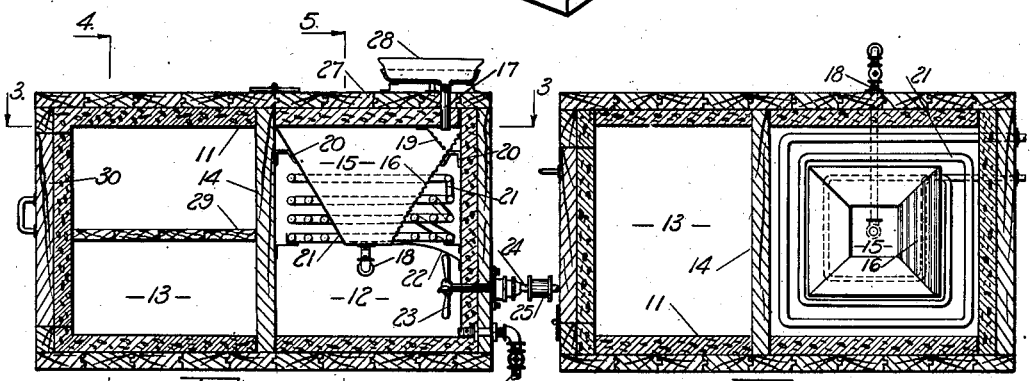
Fig. 2.   Fig. 3.
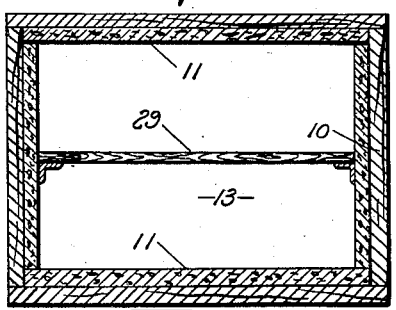  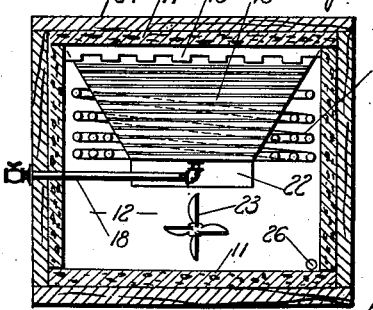
Fig. 4.   Fig. 5.
INVENTOR:
T. L. Edwards
J. Fetherstonhaugh
ATTORNEY Patented June 7, 1938

2,119,631

UNITED STATES PATENT OFFICE 2,119,631

MILK COOLER AND STORAGE CABINET

Thomas Leonard Edwards, Peterborough, Ontario, Canada

Application January 5, 1935, Serial No. 546. Renewed September 4, 1937. In Canada March 19, 1934

2 Claims. (Cl. 62—141)

The invention relates to a milk cooler and storage cabinet, as described in the present specification and illustrated in the accompanying drawing which forms a part of the same.

The invention consists essentially of the novel features of construction pointed out broadly and specifically in the claims for novelty following a description containing an explanation in detail of an acceptable form of the invention.

The objects of the invention are to devise a milk cooler and storage cabinet that will keep the milk at the required degree of temperature and at the same time provide storage facilities for other perishable goods and thereby enable the farmers and others to keep such perishable goods together with the milk after milking in a common cabinet until ready for devlivery; to furnish a cabinet that may be easily cleaned and in which the various parts may be removed with the least possible delay so that any repair work which may occur in the course of use will be expedited and thereby save the user considerable expense by eliminating unnecessary delays in repairs and at the same time so equipped as to keep the temperature of the milk down to the desired degree and avoid the possibility of the accumulation of bacteria which ordinarily occurs and keep the milk at a high grade; to erect a milk cooler and cabinet in which all available space may be taken up for storage purposes and so use up any surplus refrigerant to cool the additional space provided; to enable farmers and others to equip themselves with a milk cooler and storage cabinet at a moderate cost; and generally to provide a cooler and cabinet that will be durable in construction and of comparatively simple parts and efficient for its particular purpose.

In the drawing, Figure 1 is a perspective view of the milk cooler and storage cabinet.

Figure 2 is a side sectional view of the milk cooler and storage cabinet.

Figure 3 is a plan sectional view of the milk cooler and storage cabinet taken on the lines 3—3 in Figure 2.

Figure 4 is a vertical sectional view taken on the lines 4—4 in Figure 2.

Figure 5 is a vertical sectional view taken on the lines 5—5 in Figure 2.

Like numerals of reference indicate corresponding parts in the various figures.

Referring to the drawing, the milk cooler and storage cabinet as indicated by the numeral 10 has the insulated casing 11 which is divided to form a wet storage compartment 12 and a dry storage compartment 13, separated from one another by the vertical wall 14.

The wet storage compartment 12 contains the milk tank 15 having the corrugated wall 16 and the feed inlet 17 and the feed outlet 18, and adjacent to the feed inlet 17 is the crimped spreader 19.

The milk tank 15 is supported by means of the brackets 20 or held in any other suitable manner according to the particular requirements and is also surrounded by the refrigerant coil 21 and has at its lower end adjacent to one wall of the compartment, the baffle plate 22, and this baffle plate 22 has adjacent thereto, a circulator 23 which is connected to the shaft 24 having the pulley 25 which is suitably operated.

The wet storage compartment is filled with brine or other suitable freezing liquid and this liquid may be simply poured into the compartment, and is provided with the drain 26.

The wet storage compartment 12 has the lid 27 and the detachable milk strainer 28 is connected to the feed inlet 17 of the milk tank 15.

The dry storage compartment 13 may contain one or more shelves 29 for supporting other perishable goods, or adapted to contain cans containing the milk after it has been cooled in the wet storage compartment, and it is desired to be stored for a period of time, and it is also especially useful for such perishable goods such as butter, eggs and similar edibles, and a door 30 is provided at one end of this compartment, and it will of course be seen that the dry storage compartment is cooled by the refrigerants in the wet storage compartment, so that at all times the proper temperature is provided therewithin.

It will therefore be seen that every available space is taken care of and that the circulation of the cold air is assured.

The use of the apparatus of course is obvious, since the milk is simply poured into the tank in the wet storage compartment, where it is cooled and then removed from the milk tank and placed in the usual milk cans which in turn may be placed in the dry storage compartment; or delivered to the dairies or wherever its destination is.

Also the dry storage compartment forms a refrigerator for other perishable edibles.

What I claim is:

1. In a milk cooler and storage cabinet, a rectangular insulated casing having one section thereof forming a dry storage compartment and the other section forming a wet storage compartment, a non-insulated wall separating the compartments in said casing, a milk tank within said wet storage compartment and suitably supported and a baffle wall situated at one side of said tank connecting one of the tank walls to the compartment wall, and a circulator suitably mounted and operated adjacent to said baffle wall, refrigeration coils within said wet storage compartment and encircling said tank, a brine fluid contained within said wet storage compartment and adapted to be agitated by said circulator to form a continuous circulation throughout the wet storage compartment, a feed bowl connected to said milk tank, and entrances leading into said compartments and means for closing the entrances.

2. In a milk cooler and storage cabinet, an insulated casing having one section thereof forming a dry storage compartment and the other section forming a wet storage compartment, a milk tank having a feed inlet and a feed outlet and suitably supported within said wet storage compartment, said milk tank having a corrugated wall to form a wash-board effect, a crimped spreader within said tank and adjacent to the feed inlet, a baffle wall situated at one side of said tank and connecting one of the tank walls to the compartment wall, a circulator suitably mounted and operated adjacent to said baffle wall, refrigeration coils within said wet storage compartment and encircling said tank, a brine fluid contained within said wet storage compartment and adapted to be agitated by said circulator to form a continuous circulation throughout the wet storage compartment, a feed bowl connected to said milk tank, and entrances leading into said compartments and means for closing the entrances.

THOMAS LEONARD EDWARDS.